(12) United States Patent
Fragnito et al.

(10) Patent No.: US 9,116,530 B2
(45) Date of Patent: Aug. 25, 2015

(54) TRANSPORT REFRIGERATION SECURITY SYSTEM

(75) Inventors: Mark Fragnito, Watkinsville, GA (US); John D. Ward, Jr., Watkinsville, GA (US); Daniel L. Waser, Liverpool, NY (US); Deborah A. Champagne, North Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 13/816,639

(22) PCT Filed: Aug. 11, 2011

(86) PCT No.: PCT/US2011/047388
§ 371 (c)(1),
(2), (4) Date: Feb. 12, 2013

(87) PCT Pub. No.: WO2012/021685
PCT Pub. Date: Feb. 16, 2012

(65) Prior Publication Data
US 2013/0147624 A1 Jun. 13, 2013

Related U.S. Application Data

(60) Provisional application No. 61/373,507, filed on Aug. 13, 2010.

(51) Int. Cl.
*G08B 21/00* (2006.01)
*G05F 5/00* (2006.01)
(Continued)

(52) U.S. Cl.
CPC ............... *G05F 5/00* (2013.01); *G07C 5/0858*
(2013.01); *G08B 23/00* (2013.01); *G08B 29/181* (2013.01); *G08G 1/20* (2013.01)

(58) Field of Classification Search
CPC ......... G07C 5/008; G07C 5/0858; G08G 1/20
USPC ............................. 340/540, 539.22; 235/385
See application file for complete search history.

(56) References Cited

U.S. PATENT DOCUMENTS 4,068,769 A 1/1978 Sweet et al.
4,498,077 A 2/1985 Richardson
(Continued)

FOREIGN PATENT DOCUMENTS

EP 1067496 A1 1/2001
EP 1291629 A1 3/2003
WO WO-2008/091244 A1 7/2008

OTHER PUBLICATIONS

International Search Report and Written Opinion for related International Application No. PCT/US11/47388 filed on Aug. 11, 2011; report dated Dec. 27, 2011.

*Primary Examiner* — John A Tweel, Jr.
(74) *Attorney, Agent, or Firm* — Miller, Matthias & Hull LLP

(57) ABSTRACT

A security monitor system for a transport unit is provided. The security monitor system may include at least one security sensor configured to detect a fault condition, and a controller having a plurality of inputs, a plurality of outputs, and a low power control circuit. The low power control circuit may provide electrical communication between a battery of the transport unit, the security sensor, and at least one of the inputs of the controller. The control circuit may be configured to maintain the controller in low power mode when there are no detected fault conditions, and to enable power to the controller when there is a detected fault condition.

21 Claims, 3 Drawing Sheets

(51) Int. Cl.
  *G08G 1/00* (2006.01)
  *G07C 5/08* (2006.01)
  *G08B 29/18* (2006.01)
  *G08B 23/00* (2006.01)

(56) References Cited

U.S. PATENT DOCUMENTS 4,750,197 A   6/1988  Denekamp et al.
5,424,720 A   6/1995  Kirkpatrick
6,289,684 B1  9/2001  Guidry, II et al.
6,946,953 B2  9/2005  Lesesky et al.
7,333,015 B2  2/2008  Ekstrom
7,375,619 B2  5/2008  Auerbach et al.
7,554,441 B2  6/2009  Viegers et al.
2003/0047671 A1*  3/2003  Hironaka et al. ............. 250/221
2008/0094212 A1   4/2008  Breed
2008/0155285 A1   6/2008  Viitaniemi et al.
2009/0038322 A1   2/2009  Senf, Jr. et al.

* cited by examiner

TRANSPORT REFRIGERATION SECURITY SYSTEM

CROSS-REFERENCE TO RELATED APPLICATION

This application is a 35 U.S.C. §371 U.S. national stage filing of International Patent Application No. PCT/US11/47388 filed on Aug. 11, 2011 claiming priority under the Paris Convention and 35 U.S.C. §119(e) to U.S. Provisional Patent Application Ser. No. 61/373,507 filed on Aug. 13, 2010.

FIELD OF THE DISCLOSURE

The present disclosure generally relates to transport units, and more particularly, to security systems and methods for monitoring transport refrigeration units.

BACKGROUND OF THE DISCLOSURE

Security systems are well known in the art and commonly used to monitor various parameters of transport refrigeration units and the cargo carried therein. Such security systems provide security sensors that are configured to, for instance, determine the status of one or more doors of the transport unit and monitor the level of fuel in the transport unit. Using these sensors, it is possible to detect unauthorized access to the cargo and/or detect critical levels of fuel so as to provide the appropriate alerts and inform those responsible of the transport unit or cargo. More specifically, the data provided by the security sensors can be transmitted to a remote monitoring facility, stored at a local data recorder for later retrieval, or used by the control system to trigger an alarm if the data indicates atypical and/or unfavorable events. Although these control systems offer some level of security, there are still some significant deficiencies.

In order to effectively monitor the transport refrigeration unit and its respective cargo, existing security systems require a continuous supply of direct current (DC) power that is generally supplied by the battery of the transport vehicle or unit. As with common vehicle accessories, these control systems are typically switched to the ignition system of the transport unit such that DC power is only supplied while the engine, alternator and/or the battery of the transport unit is powered on. When the ignition is switched off, however, the power supplied to the control system as well as most other vehicle accessories is disabled. Furthermore, when the control system is disabled, its security sensors are unable to detect a fault condition in which, for example, a door has been opened without authorization. In such a way, even with such security measures, transport units are still vulnerable to theft, vandalism, and the like, when they are powered off and/or left unattended.

To compensate for such vulnerabilities, some existing control systems provide periodic monitoring while the transport unit is powered off. These control systems are configured to enter a sleep mode when the transport unit is turned off, during which the security sensor data are monitored and/or recorded at predetermined wake up intervals rather than being continuously on. However, the wake up intervals are generally long, lasting anywhere between 15 minutes to an hour, so as to conserve battery power and memory space. Any fault condition which occurs during these intervals can only be detected at the next wake up instance resulting in a delayed rather than an immediate response. Furthermore, during these long intervals, a person can easily disconnect the battery, disable power to the security sensors and access the cargo without triggering any alarm. Accordingly, while wake up circuits provide some added security, transport refrigeration units are still vulnerable to theft when they are powered off and/or unattended.

It is therefore an object of the present disclosure to provide a security device and system that overcomes such deficiencies and provides more comprehensive monitoring of a transport unit. Specifically, there is a need for a security device that is capable of continuously monitoring the key parameters of a transport refrigeration unit for extended periods of time regardless of the operational status thereof. Moreover, there is a need for a security system that can operate on reduced power and provide immediate response to a fault condition.

SUMMARY OF THE DISCLOSURE

In accordance with one aspect of the disclosure, an energy conserving security monitor system for a transport unit is provided. The security monitor system may include at least one input device configured to receive an input signal for selectively performing a function on the transport unit, and a controller having a plurality of inputs, a plurality of outputs, and a low power control circuit. The low power circuit may provide electrical communication between a battery of the transport unit, the input device, and at least one of the inputs of the controller. The control circuit may be configured to maintain the controller in low power mode when the input signal is not indicative of performing a function on the transport unit. The control circuit may be configured to enable power to the controller when the input signal is indicative of performing a function on the transport unit.

In accordance with another aspect of the disclosure, a security monitor system for a transport unit is provided. The security monitor system may include at least one security sensor configured to detect a fault condition, and a controller having a plurality of inputs, a plurality of outputs, and a low power control circuit. The low power circuit may provide electrical communication between a battery of the transport unit, the security sensor, and at least one of the inputs of the controller. The control circuit may be configured to maintain the controller in low power mode when there are no detected fault conditions. The control circuit may be configured to enable power to the controller when there is a detected fault condition.

In accordance with another aspect of the disclosure, another security monitor system for a transport refrigeration unit is provided. The security monitor system may include at least one door switch configured to detect unauthorized access to the transport refrigeration unit, and a controller having a plurality of inputs, a plurality of outputs, and a low power control circuit. The low power control circuit may provide electrical communication between a battery of the transport refrigeration unit, the door switch, and at least one of the inputs of the controller. The control circuit may be configured to maintain the controller in low power mode when there are no detected fault conditions. The control circuit may be configured to enable power to the controller when there is a detected fault condition.

In accordance with yet another aspect of the disclosure, a method for conserving energy in a transport unit is provided. The method may provide an input device configured to receive an input signal and selectively perform a function on the transport unit based on the input signal, provide a low power control circuit in communication between a battery of the transport unit, the input device and at least one of the inputs of the controller, maintain the controller in low power mode when the input signal is not indicative of performing a function on the transport unit, and automatically enable power to the controller when the input signal is indicative of performing a function on the transport unit. The low power control circuit may be configured to bias a controller into a low power mode of operation.

These and other aspects of this disclosure will become more readily apparent upon reading the following detailed description when taken in conjunction with the accompanying drawings.

Figure 1:
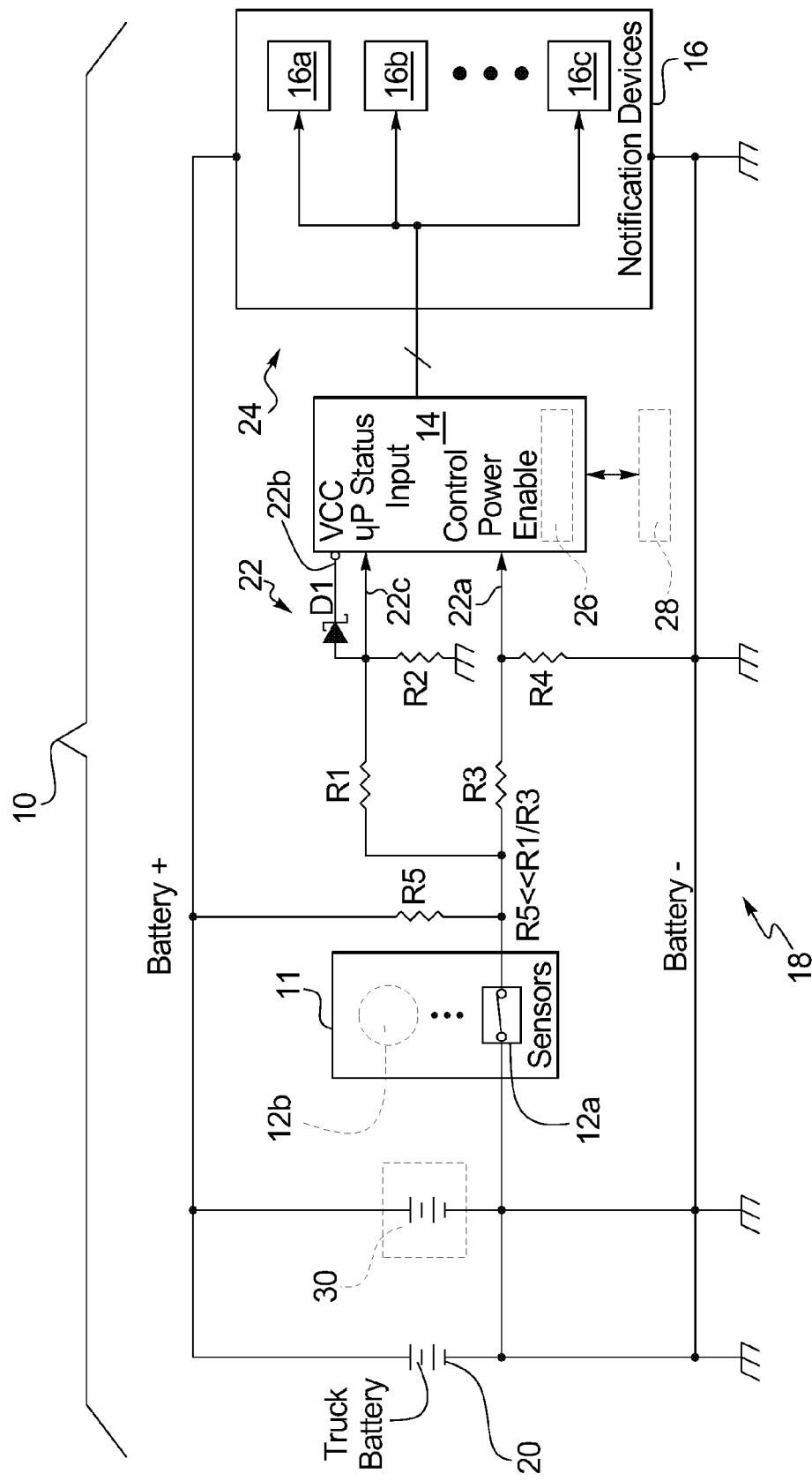
FIG. 1 is a schematic diagram of an exemplary security monitor system as applied to a transport refrigeration unit.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Referring to the drawings and with particular reference to FIG. 1, an exemplary security monitor system for a transport refrigeration unit is provided and referred to as reference number 10. It is understood that the teachings of the disclosure may be used to construct security monitor systems for transport units above and beyond those specifically disclosed below. One of ordinary skill in the art will readily understand that the following are only exemplary embodiments.

Figure 2:
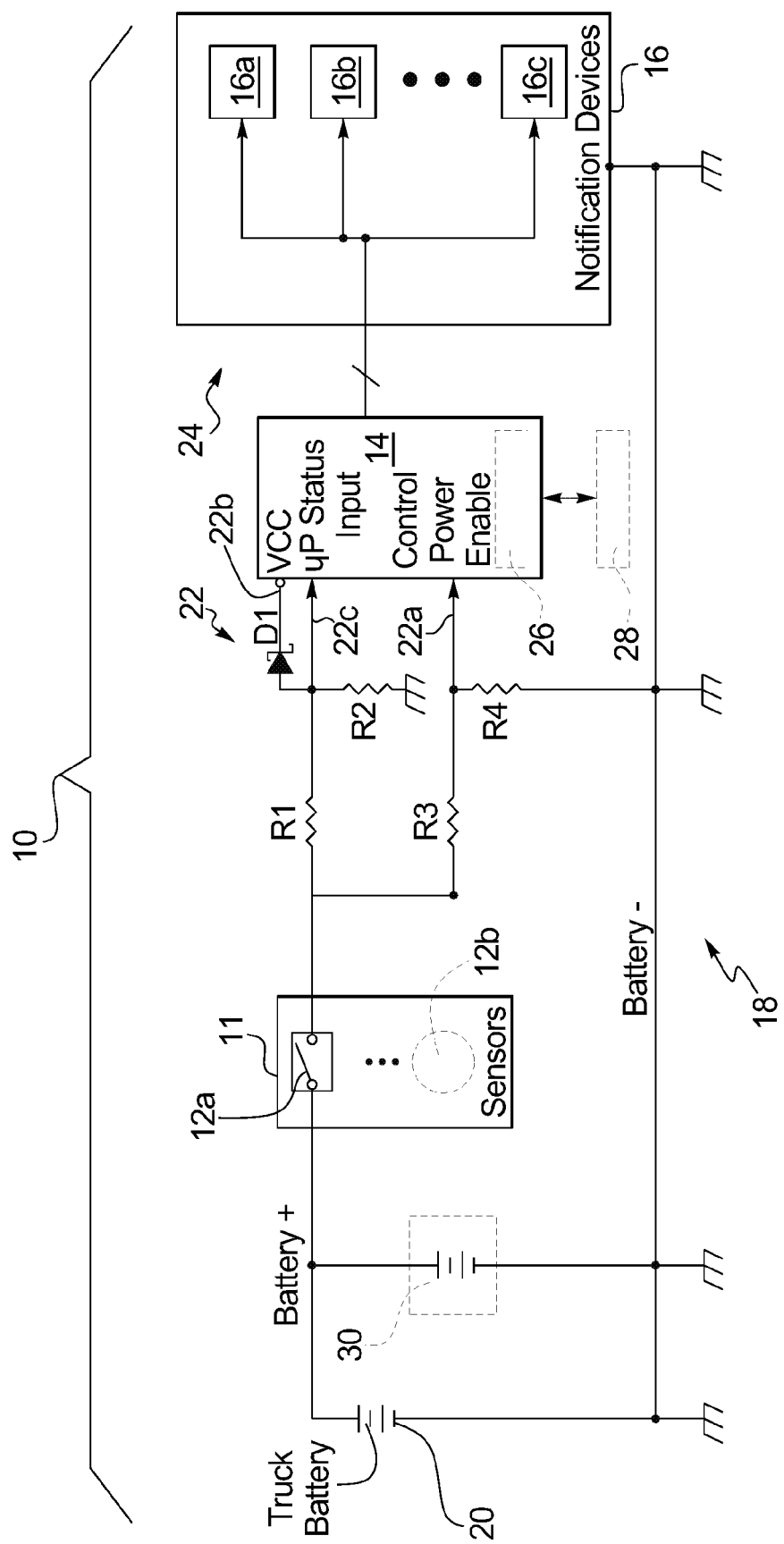
FIG. 2 is a schematic diagram of another exemplary security monitor system.

Turning to FIGS. 1-2, schematics of exemplary low power security monitor systems 10 that may be installed in a transport refrigeration unit are provided. In addition to transport refrigeration units, the security monitor systems 10 disclosed herein may also be integrated into other types of transport units, such as trailers, freight containers, trucks, rail cars, and the like. Moreover, the security monitor systems 10 may be provided to any transport unit which requires continuous monitoring of one or more parameters thereof but is limited to a portable energy source, such as a battery or a fuel tank with a capacity that is restricted to what the transport unit can carry or support.

As shown in FIGS. 1-2, an exemplary security monitor system 10 may essentially include one or more input devices 11, such as security sensors 12, a controller 14, notification devices 16, and a low power control circuit 18 for electrically coupling these components to a power source of the transport unit, such as a battery 20, or the like. The input devices 11 may be associated with an auxiliary or accessory device of the transport unit and configured to receive an input signal from an operator and/or owner of the transport unit. The auxiliary or accessory devices associated with the input devices 11 may include, for example, a refrigeration unit, a heating, ventilation and air-conditioning (HVAC) system, a lighting unit, or any other accessory that may receive power from the battery 20 and/or fuel combustion. Based on the input signal received by the input device 11, the controller 14 may be selectively perform an auxiliary or accessory function on the transport unit, such as operating a portable refrigeration unit, operating the HVAC system, providing light, and the like.

The input devices 11 may also include security sensors 12 that are configured to observe various security parameters of the transport unit while the controller 14 monitors the observed parameters for fault conditions. If a fault condition is determined by the controller 14, the appropriate notification devices 16 may alert and notify the users and/or owners of the transport unit of the fault condition. Furthermore, the low power configuration of the control circuit 18 may ensure that the controller 14 is only engaged when it is needed, for example, when a potential fault is detected at the security sensors 12. Such a low power configuration essentially eliminates the amount of time the controller 14 is needlessly online, and thus, greatly reduces the power consumed by the controller 14. By reducing the amount of energy needed to operate the controller 14, the charge in the battery 20 is greatly conserved, and among other things, fuel consumption may be significantly reduced.

The security sensors 12 of FIGS. 1-2 may include one or more sensors that are configured to detect fault conditions, or critical changes to the transport unit that may be indicative of unauthorized access, theft, vandalism, malfunction of the transport unit, or any other abnormal or undesired activity. For example, the security sensors 12 may include a discrete sensor, such as a door switch 12a that is capable of determining when a cargo door of the transport unit is opened or closed. As shown in FIG. 1, the door switch 12a may be a normally closed switch which allows flow of current therethrough when all of the doors of the transport unit are closed. When at least one cargo door is opened, the normally closed door switch 12a may open to break the flow of current. Alternatively, the door switch 12a may also be a normally opened switch, as shown in FIG. 2, which prohibits flow of current therethrough when all of the doors are closed. When at least one cargo door is opened, the normally opened switch 12a may close to enable flow of current therethrough.

The security sensors 12 may also include an analog sensor, such as a fuel level sensor 12b which outputs a continuous analog signal that is indicative of the level of fuel in the transport unit. Based on such feedback, a corresponding controller 14 may be able to monitor for a critically low level of fuel and/or for a critically high rate of reduction in fuel. In alternative embodiments, the security sensors 12 may include a battery voltage sensor and/or battery connection sensor that is configured to detect when the battery voltage level drops to a critical minimum and/or detect when the battery 20 is disconnected. In still further alternatives, the security sensors 12 may additionally include one or more of a temperature sensor, pressure sensor, a humidity sensor, a movement sensor, an impact sensor, a tilt sensor, and the like.

Still referring to FIGS. 1-2, the controller 14 of the security monitor system 10 may be implemented using one or more of a processor, a microprocessor, a microcontroller, an electronic control module (ECM), an electronic control unit (ECU), or any other suitable means for electronically controlling functionality of the security monitor system 10. The controller 14 may include a plurality of inputs 22 for receiving discrete and/or analog electronic signals as well as a plurality of outputs 24 for transmitting discrete and/or analog electronic signals to other auxiliary, accessory or periphery devices, such as the notification devices 16 shown.

Among the inputs 22 provided, the controller 14 may include at least a power enabling input 22a and a reference voltage input 22b. Based on the input voltage received at the power enabling input 22a, the controller 14 may be powered off, powered on, placed in low power mode, placed in sleep mode, or the like. For example, the controller 14 may be configured to automatically power on if the electrical signal provided to the power enabling input 22a corresponds to approximately 5 VDC, 10 VDC, 15 VDC, or any other direct current (DC) reference voltage corresponding to a logical high value. The appropriate reference voltage may be determined in accordance with the voltage value provided to the reference voltage input 22b of the controller 14. The reference voltage may also be determined based on the respective specifications of the battery 20 of the transport unit, the resistance values R1-R5 provided by the low power control circuit 18, and the like.

The controller 14 may also be powered off if the voltage at the power enabling input 22a is less than a predetermined minimum voltage to conserve energy. For instance, if the voltage supplied to the power enabling input 22a is approximately 0 VDC or corresponding to a logical low value, the controller 14 may automatically power off and remain powered off until the next logical high value is received. In alternative embodiments, the controller 14 may provide a power enabling input 22a that is inverted, in which case voltage supplied to the power enabling input 22a corresponding a logical low value may be used to power on the controller 14 while a voltage corresponding to a logical high value may be used to power off the controller 14.

The controller 14 may additionally operate in a low power mode of operation or a sleep mode so as to conserve battery power or fuel. Low power or sleep modes may enable the controller 14 to operate on minimal battery power while still allowing some functionality thereof, such as the monitoring of security sensors 12. During low power mode or sleep mode, the voltage provided at the power enabling input 22a may be within a predetermined range of relatively low voltages. For instance, the range of voltages corresponding to low power mode may be higher in magnitude than 0 VDC but lower in magnitude than the reference voltage provided, for example, 5 VDC, 10 VDC, 15 VDC, or the like. The controller 14 may be configured to enter a low power mode or sleep mode by its own determination based on different criteria preprogrammed therein. Low power mode or sleep mode may also be induced on the controller 14 by adjusting the voltage supplied thereto. The controller 14 may further include a status input 22c by which the controller 14 may determine the desired or current mode of operation based on, for example, the magnitude of the voltage detected at the status input 22c.

In response to the input signals and any fault conditions, the controller 14 may generate one or more signals at its outputs 24 to be transmitted to one or more auxiliary, accessory or periphery devices of the transport unit, such as the notification devices 16 shown. The notification devices 16 may include one or more of an audible device 16a, a visual device 16b, and the like. The audible device 16a may include a ringer, a buzzer, or any other device that can produce an audible alert and call attention to the transport unit. The visual device 16b may include blinking light emitting diodes (LEDs), screen activity on a liquid crystal display (LCD), or any other form of visual alert that may call attention to the transport unit. Each of the audible device 16a and the visual device 16b may be provided in the vicinity of the transport unit and/or at a remote monitoring location.

The notification device 16 may also employ a telematic device 16c that is configured to generate an alert to the appropriate users and/or owners of the transport unit via cellular networks, satellite communications, and the like. More specifically, the controller 14 and the telematic device 16c may generate a fault code, a text message, electronic mail message, or the like, and further, transmit the code or message to the pager, cellular device or computer of the respective users and/or owners. The code or message may simply indicate that a fault condition has been detected, or provide further details of the detected fault, such as the type of fault, the frequency or duration of the fault, possible solutions for correcting the fault, and the like.

As shown in FIGS. 1-2, the low power control circuit 18 may be configured to interconnect each of the security sensors 12, controller 14, notification devices 16 and the battery 20 so as to enable the security monitor system 10 to fully operate on minimal power from the battery 20 and on minimal fuel. More specifically, the control circuit 18 may be configured such that the discrete security sensors 12, such as door switches 12a, enable or disable an electrical connection between the power enabling input 22a of the controller 14 and the battery 20 based on the state of the security sensors 12. In embodiments in which analog sensors, such as fuel level sensors 12b, are employed, the low power control circuit 18 and controller 14 may be configured to enable monitoring of the analog sensor while in a low power mode of operation.

In association with the discrete and normally closed door switch 12a of FIG. 1, for example, the low power control circuit 18 may be configured to electrically couple the power enabling input 22a of the controller 14 to ground while the door switch 12a is closed. As such, the controller 14 may be provided with a logical low voltage value so as leave the controller 14 powered off or in a low power mode when there are no faults present. When one or more doors are opened and when the door switch 12a is opened, the power enabling input 22a of the controller 14 may be disconnected from ground and provided with a logically high voltage value from the positive terminal of the battery 20. Similarly, in association with the discrete and normally opened door switch 12a of FIG. 2, the low power control circuit 18 may be configured to electrically couple the power enabling input 22a of the controller 14 to ground while the door switch 12a is opened. As such, the controller 14 may be provided with a logical low voltage value so as leave the controller 14 powered off or in a low power mode when there are no faults present. When one or more doors are opened and when the door switch 12a is closed, the power enabling input 22a of the controller 14 may be provided with a logically high voltage value from the positive terminal of the battery 20.

Once supplied with an enabling voltage, the controller 14 may automatically wake up from the low power mode and power on. The controller 14 may then determine whether the detected fault condition, or the opening of cargo doors, was an authorized or an unauthorized event. If the fault condition is confirmed to be an authorized event, the controller 14 may simply ignore the fault, return to low power or sleep mode and continue monitoring the security sensors 12. If the fault condition is confirmed to be an undesired or unauthorized event, the controller 14 may generate the appropriate signals to be transmitted to the notification devices 16. Based on the signals received from the controller 14, for example, one or more of the audible device 16a, visual device 16b and telematic device 16c may be engaged to alert the users and/or owners of the transport unit. The controller 14 may further be configured to automatically record any or all data pertaining to the transport unit in response to the detected fault. The recorded data may be stored in a memory 26, 28 for later retrieval and review. The manner in which the controller 14 responds to a detected fault condition may be configurable by the user and/or owner of the transport unit. For example, a user or owner may enable or disable one or more of the notification devices 16 that are set to engage for a particular fault type. A user or owner may also adjust the types of data to record, duration of the recording, interval of the recording or disable the data recording feature.

Still referring to FIGS. 1-2, the low power control circuit 18 may also provide electrical communication with a backup battery 30. For instance, a secondary battery 30 may be coupled to the security sensors 12, the controller 14 and the notification devices 16 through an auxiliary and/or a parallel connection therewith. The auxiliary connection may further be automatically switched such that the backup battery 30 is only coupled to the security monitor system 10 if the primary battery 20 is disconnected. Accordingly, the security sensors 12 may employ a battery connection sensor for monitoring the connection to the primary battery 20.

Figure 3:
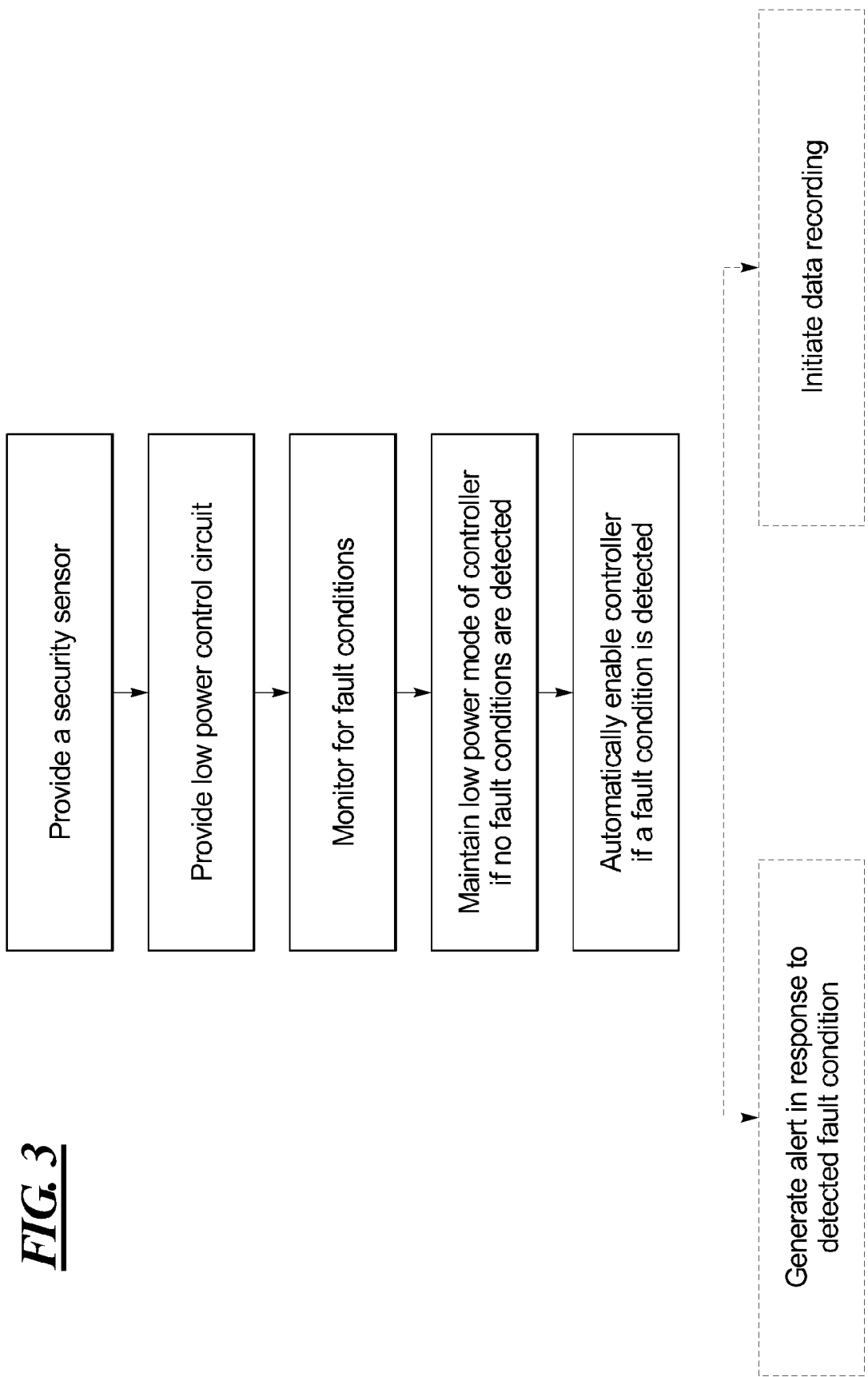
FIG. 3 is flow diagram of an exemplary method for monitoring a transport refrigeration unit.

Turning now to FIG. 3, an exemplary method by which the controller 14 may conserve energy while monitoring a transport unit is provided. In particular, the controller 14 may be preprogrammed with an algorithm or a set of program codes to perform according to the method shown. The algorithm may be stored within an on-board or internal memory 26 of the controller 14 and/or on an external memory 28 that is in communication with the controller 14. The external memory 28 may take the form of, for example, a floppy disk, a hard disk, optical medium, random access memory (RAM), read-only memory (ROM), or any other suitable computer-readable storage medium commonly used in the art.

In accordance with the embodiments of FIGS. 1-2, the method of FIG. 3 may include a step of providing at least one security sensor 12 that is configured to detect a fault condition within a transport unit. The method may also enable electrical communication between the battery 20 of the transport unit, the security sensor 12 and the inputs 22 of the controller 14 using a low power control circuit 18. The low power control circuit 18 may be configured to bias the controller 14 into a low power mode of operation so as to conserve battery power. The method may further monitor for any faults detected by the security sensor 12. If no faults are detected, the method may continue to maintain the controller 14 in low power mode. If one or more faults are detected, the method may automatically direct power from the battery 20 to a power enabling input 22a of the controller 14 so as to wake the controller 14 up from the low power mode and to allow the controller 14 to respond to the detected fault accordingly. Optionally, the method may further generate an alert, for example, using one of the notification devices 16 of FIGS. 1-2, so as to notify a user and/or owner of the transport unit of the detected fault condition. Additionally or alternatively, the method may record various data from the transport unit for a predefined period of time in response to the detected fault condition.

Based on the foregoing, it can be seen that the present disclosure provides more comprehensive monitoring of a transport refrigeration unit with several advantages over currently existing security configurations built for transport units. Moreover, the present disclosure provides continuous monitoring of various parameters of a transport unit for extended periods of time without being limited to the operation state of the transport unit. Furthermore, the present disclosure provides such continuous monitoring schemes while, among other things, significantly conserving battery charge and fuel.

While only certain embodiments have been set forth, alternatives and modifications will be apparent from the above description to those skilled in the art. These and other alternatives are considered equivalents and within the spirit and scope of this disclosure.

What is claimed is:

1. A security monitor system for a transport refrigeration unit, the transport refrigeration unit being operatively associated with a vehicle and including a battery operatively associated with the transport refrigeration unit, the security monitor system comprising:
   at least one security sensor operatively associated with the transport refrigeration unit and configured to detect a fault condition associated with the transport refrigeration unit, the fault condition indicative of changes to the transport refrigeration unit; and
   a controller having a plurality of inputs, a plurality of outputs, and a low power control circuit providing electrical communication between the battery of the transport unit, the security sensor, and at least one of the inputs of the controller, the control circuit being configured to maintain the controller in low power mode when there are no detected fault conditions, the control circuit being configured to enable power to the controller when there is a detected fault condition.

2. The security monitor system of claim 1, wherein the security sensor includes one or more of a door switch, a fuel lever sensor, a battery voltage sensor, a battery connection sensor, a temperature sensor, a pressure sensor, a humidity sensor, a movement sensor, an impact sensor, and a tilt sensor.

3. The security monitor system of claim 1, wherein the control circuit further provides electrical communication between at least one notification device and at least one of the outputs of the controller, the controller being configured to enable the notification device in response to a fault condition detected at the security sensor.

4. The security monitor system of claim 3, wherein the notification device includes one or more of an audible device, a visual device, and a telematic device.

5. The security monitor system of claim 1, wherein the controller is further configured to retrievably record any data pertaining to fault conditions detected by the security sensor in a memory.

6. The security monitor system of claim 1, wherein the control circuit further provides electrical communication with a backup battery.

7. The security monitor system of claim 1, wherein the security sensor includes a normally closed switch disposed between the battery and a power enabling input of the controller.

8. The security monitor system of claim 1, wherein the security sensor includes a normally opened switch disposed between the battery and a power enabling input of the controller.

9. The security system of claim 1, wherein the security sensor includes an analog sensor, the controller being configured to continuously monitor readings of the analog sensor while operating in the lower power mode.

10. A security monitor system for a transport refrigeration unit, the transport unit being operatively associated with a vehicle and including a battery operatively associated with the transport unit, the security monitor system comprising:
    at least one door switch operatively associated with the transport refrigeration unit and configured to detect a fault condition indicative of unauthorized access to the transport refrigeration unit; and
    a controller having a plurality of inputs, a plurality of outputs, and a low power control circuit providing electrical communication between the battery of the transport refrigeration unit, the door switch, and at least one of the inputs of the controller, the control circuit being configured to maintain the controller in low power mode when there are no detected fault conditions, the control circuit being configured to enable power to the controller when there is a detected fault condition.

11. The security monitor system of claim 10, wherein the door switch is electrically coupled between the battery and at least a power enabling input of the controller.

12. The security monitor system of claim 10 further comprising a fuel level sensor configured to detect at least one of a level of fuel and a rate of reduction in fuel in the transport unit.

13. The security monitor system of claim 10 further comprising one or more of a battery voltage sensor, a battery connection sensor, a temperature sensor, a pressure sensor, a humidity sensor, a movement sensor, an impact sensor, and a tilt sensor.

14. The security monitor system of claim 10, wherein the control circuit further provides electrical communication between at least one notification device and at least one of the outputs of the controller, the controller being configured to enable the notification device in response to a fault condition detected at the security sensor.

15. The security monitor system of claim 14, wherein the notification device includes one or more of an audible device, a visual device, and a telematic device.

16. The security monitor system of claim 10, wherein the notification device to be used in response to a detected fault is configurable by a user.

17. The security monitor system of claim 10, wherein the controller is configured to retrievably record any data pertaining to fault conditions detected by the security sensor in a memory.

18. The security monitor system of claim 10, wherein the control circuit further provides electrical communication to a backup battery.

19. A method for conserving energy in a transport refrigeration unit, the transport unit being operatively associated with a vehicle and including a battery operatively associated with the transport unit, the method comprising the steps of:
providing an input device operatively associated with the transport refrigeration unit and configured to receive an input signal and selectively perform a function on the transport refrigeration unit based on the input signal;
providing a low power control circuit in communication between the battery of the transport unit, the input device and at least one of the inputs of a controller, the low power control circuit being configured to bias the controller into a low power mode of operation;
maintaining the controller in low power mode when the input signal received by the input device is not indicative of performing a function; and
automatically enabling power to the controller when the input signal received by the input device is indicative of performing a function.

20. The method of claim 19, wherein the input device includes a security sensor configured to detect a fault condition associated with the transport refrigeration unit, the controller being maintained in low power mode if there are no fault conditions detected by the security sensor and being automatically enabled when a fault condition is received.

21. The method of claim 20 further comprising the step of generating an alert in response to the detected fault condition.

* * * * *